(12) United States Patent
Dropuljic et al.

(10) Patent No.: US 12,206,820 B2
(45) Date of Patent: Jan. 21, 2025

(54) DETECTION OF UNWANTED CALLS OR CALLER INTENT BASED ON A FUSION OF ACOUSTIC AND TEXTUAL ANALYSIS OF CALLS

(71) Applicant: RealNetworks LLC, Seattle, WA (US)

(72) Inventors: Branimir Dropuljic, Zagreb (HR); Michael J. Bordash, Newtown, CT (US)

(73) Assignee: REALNETWORKS LLC, Seattle, WA (US)

( * ) Notice: Subject to any disclaimer, the term of this patent is extended or adjusted under 35 U.S.C. 154(b) by 280 days.

(21) Appl. No.: 17/877,713

(22) Filed: Jul. 29, 2022

(65) Prior Publication Data

US 2024/0040035 A1   Feb. 1, 2024

(51) Int. Cl.
*H04M 3/436* (2006.01)
*G10L 15/00* (2013.01)
*G10L 15/26* (2006.01)

(52) U.S. Cl.
CPC .......... *H04M 3/436* (2013.01); *G10L 15/005* (2013.01); *G10L 15/26* (2013.01)

(58) Field of Classification Search
CPC . H04M 3/436; H04M 2201/40; G10L 15/005; G10L 15/26; G10L 25/51; G06F 40/30
See application file for complete search history.

(56) References Cited

U.S. PATENT DOCUMENTS

| 6,330,317 | B1 | 12/2001 | Garfinkel |
| 6,549,619 | B1 | 4/2003 | Bell et al. |
| 8,325,900 | B2 | 12/2012 | Trivi et al. |
| 8,589,167 | B2 | 11/2013 | Baughman et al. |

(Continued)

FOREIGN PATENT DOCUMENTS

| CN | 109905282 A | 6/2019 |
| CN | 110929530 A | 3/2020 |

(Continued)

OTHER PUBLICATIONS

International Search Report and Written Opinion for International Application No. PCT/US2023/028871, dated Nov. 20, 2023, 10 pages.

*Primary Examiner* — Abul K Azad
(74) *Attorney, Agent, or Firm* — Seed IP Law Group LLP

(57) ABSTRACT

Systems and methods for processing calls to determine if the call is potentially fraudulent or unwanted. The system extracts a speech signal from an audio signal associated with a call. The system identifies audio characteristics based on analysis of the audio signal. The system generates textual transcript of the audio signal based on automatic speech recognition of the speech signal, which is used to assign text categories for the call based on an automated multi-label textual classification of the textual transcript. The system assigns audio categories for the call based on automated multi-label acoustic classification of the speech signal. The system generates an output label for the call based on a combined analysis of the text categories, the audio categories, and the audio characteristics. The language spoken during the call may be detected and used to generate the textual transcript and to assign the text categories and the audio categories.

24 Claims, 12 Drawing Sheets

(56) References Cited

U.S. PATENT DOCUMENTS

| | | |
|---|---|---|
| 8,942,357 B2 | 1/2015 | Goulet |
| 9,060,057 B1 | 6/2015 | Danis |
| 9,712,681 B1 | 7/2017 | Cohen et al. |
| 10,051,121 B2 | 8/2018 | Quilici et al. |
| 10,110,741 B1 | 10/2018 | Cohen et al. |
| 10,204,099 B2 | 2/2019 | Orsini et al. |
| 10,447,838 B2 | 10/2019 | Weiss et al. |
| 10,498,887 B2 | 12/2019 | Quilici et al. |
| 10,523,814 B1 | 12/2019 | Moore et al. |
| 10,582,041 B2 | 3/2020 | Gallagher et al. |
| 10,805,458 B1 | 10/2020 | Grabowski et al. |
| 11,150,880 B1* | 10/2021 | Parisa .................. G06N 5/01 |
| 11,153,435 B2 | 10/2021 | Grabowski et al. |
| 11,172,002 B2 | 11/2021 | Filart |
| 11,196,859 B1 | 12/2021 | Yin |
| 11,252,278 B2 | 2/2022 | Quilici et al. |
| 11,558,506 B1* | 1/2023 | Cardillo ............... G10L 17/26 |
| 2009/0147930 A1 | 6/2009 | Rice |
| 2014/0192965 A1 | 7/2014 | Almeida |
| 2015/0195403 A1 | 7/2015 | Goulet et al. |
| 2017/0134574 A1* | 5/2017 | Winkler ............. H04L 63/0861 |
| 2018/0249005 A1 | 8/2018 | Dowlatkhah et al. |
| 2020/0143822 A1 | 5/2020 | Carriero et al. |
| 2020/0314227 A1 | 10/2020 | Bradley et al. |
| 2021/0037133 A1 | 2/2021 | Smelyansky |
| 2021/0092223 A1 | 3/2021 | Gallagher et al. |
| 2021/0134284 A1* | 5/2021 | Adibi .................... G10L 15/22 |
| 2021/0264897 A1* | 8/2021 | Churaev ............... G06F 40/30 |
| 2021/0266407 A1* | 8/2021 | Burton ............... G06Q 30/016 |
| 2021/0377389 A1 | 12/2021 | Combellas |
| 2022/0060579 A1 | 2/2022 | Quilici et al. |
| 2023/0072352 A1* | 3/2023 | Geng .................... G10L 15/16 |
| 2023/0102179 A1* | 3/2023 | Elango ................. G06N 5/022 |
| | | 704/235 |

FOREIGN PATENT DOCUMENTS

| | | | |
|---|---|---|---|
| KR | 10-2012-0010372 A | 2/2012 | |
| KR | 10-1945782 B1 | 2/2019 | |
| KR | 10-2228021 B1 | 3/2021 | |
| WO | WO-2021101935 A1 * | 5/2021 | .......... G06F 16/685 |
| WO | 2022/015613 A1 | 1/2022 | |

* cited by examiner

ANALYSIS DETAILS

| ID* | TYPE* | START OFFSET* | END OFFSET* | PRELIMINARY* | SYNTHETIC* | CLASSIFICATION* | HAM CATEGORIES* | SPAM CATEGORIES* | ASR TEXT* |
|---|---|---|---|---|---|---|---|---|---|
| 1 | VAD | 100 | 9500 | FALSE | | | | | |
| 2 | SYNTHETIC | 100 | 1100 | FALSE | ROBOT | | | | |
| 3 | VAD | 10000 | 95000 | FALSE | | | | | |
| 4 | ASR | 540 | 9000 | FALSE | | SPAM | FINANCIAL | FRAUD | THIS IS A... |
| 5 | CATEGORIZATION | 540 | 95000 | FALSE | | | | | |
| 6 | ASR | 10700 | 95000 | FALSE | | | | | IF WE DO NOT... |

*Fig. 5B*

DETECTION OF UNWANTED CALLS OR CALLER INTENT BASED ON A FUSION OF ACOUSTIC AND TEXTUAL ANALYSIS OF CALLS

TECHNICAL FIELD

The following disclosure relates generally to techniques for processing audio calls, and in particular identification of unwanted calls or caller intent based on fusion of acoustic and textual aspects of caller's audio signals.

BACKGROUND

Description of the Related Art

Spammers traditionally rely on email or text messages to defraud people or to steal information. The quantity of messages being sent within and between messaging platforms has risen steadily in the last several years, typically corresponding to a rise in a quantity of mobile device and other subscriber users, as well as a rise in the use of alternative types of such messages. In more recent years, spammers have been using unwanted calls to defraud people or to steal information. These unwanted calls can come in a variety of forms, such as spam calls, scam calls, robocalls, number spoofing calls, and identity theft calls, to name a few. These unwanted calls may also potentially include benevolent callers, informational calls, or other calls not wanting to be received.

Unfortunately, unwanted calls can be difficult to identify as spammers can often avoid, fool, or render ineffective traditional call scanning mechanisms. For example, relying on users to identify and forward information regarding unwanted calls can suffer from low report rates and delays. Legitimate users may also be impacted if fake spam reports are provided. Similarly, spammers can block or change their sending information to avoid systems that block particular callers. It is with respect to these and other considerations that the present disclosure has been prepared.

BRIEF SUMMARY

Embodiments described herein are generally directed to the processing of intra- and inter-call platform communications. Calls between a caller and a callee are processed to determine if the call wanted or if the call is fraudulent or potentially fraudulent and thus unwanted, such as spam, scams, or vishing. Embodiments described herein can also be utilized to determine the caller's intent.

The system extracts a speech signal from an audio signal associated with a call. The system identifies audio characteristics based on an analysis of the audio signal. The system also generates a textual transcript of the audio signal based on automatic speech recognition of the speech signal, which is used to assign text categories for the call based on an automated multi-label textual classification of the textual transcript. The system assigns audio categories for the call based on an automated multi-label acoustic classification of the speech signal. Various machine learning or deep learning techniques or mechanisms may be employed to generate the textual transcript, to assign the text categories, or to assign the audio categories. The system generates an output label for the call based on a combined analysis of the text categories, the audio categories, and the audio characteristics. In some embodiments, the system generates the output label for the call by analyzing the text categories, the audio categories, or the audio characteristics, or some combination thereof, using a machine learning model trained from training text category data, training audio category data, or training audio characteristic data, or some combination thereof; and employing the machine learning model to generate the output label indicating a probability that the call is unwanted.

The system can then determine that the output label identifies the call as wanted or unwanted. In some embodiments, the call may be terminated in response to determining that the call is unwanted. If the call is wanted, the call may be forwarded to a destination device or the caller may be labeled as a non-spammer Overall, embodiments described herein improve and enhance the likelihood of detecting a potentially fraudulent and unwanted calls, while reducing the computing resources necessary to determine if a call is unwanted or not.

BRIEF DESCRIPTION OF THE SEVERAL VIEWS OF THE DRAWINGS

Non-limiting and non-exhaustive embodiments are described with reference to the following drawings. In the drawings and specification, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn, are not intended to convey any information regarding the actual shape of the particular elements, and have been solely selected for ease of recognition in the drawings.

FIGS. 5A and 5B illustrate a graphical user interface showing functional embodiments of the call management platform in accordance with embodiments described herein.

DETAILED DESCRIPTION

Figure 1:
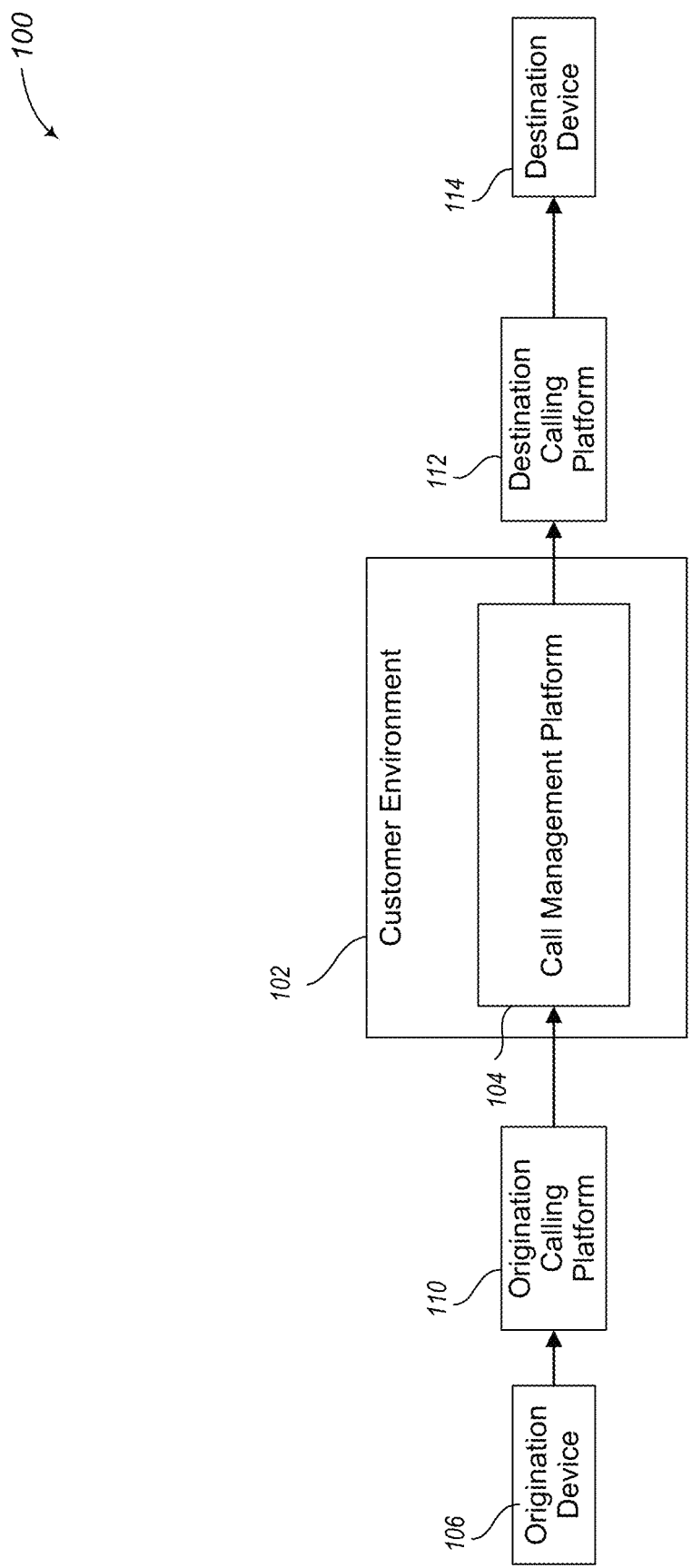
FIG. 1 is a schematic diagram of a networked environment that includes a call management platform in accordance with techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The following is a brief introduction to call platform communications. In general, calls are peer-to-peer ("P2P") (e.g., from a first personal communication device to a second personal communication device). However, some calls may be automated, such as application-to-person ("A2P")(e.g., from an application server to a personal communication device that has a corresponding application installed thereon) or machine-to-person ("M2P")(e.g., from one non-personal device to a personal communication device. Calls sent or transmitted from a first device associated with a first calling platform (also referred to as an origination calling platform) to a second device associated with a distinct second calling platform (also referred to as a destination calling platform) may or may not be delivered by either or both of those two calling platforms. For example, a phone call sent from a Verizon subscriber (e.g., using the Verizon infrastructure as the origination calling platform) may be forwarded to a T-Mobile subscriber (e.g., using the T-Mobile infrastructure as the destination calling platform). As another example, a phone call sent from a Verizon subscriber (e.g., using the Verizon infrastructure as the origination calling platform) may be sent to another Verizon subscriber (e.g., also using the Verizon infrastructure as the destination calling platform). As yet another example, a call may be initiated using a non-phone-related mechanism, such as a call over IP through a social-media-application server, and sent to a Verizon subscriber. In some scenarios, additional over-the-top service providers can monitor or handle calls with carriers either directly or through an interconnect vendor.

In order to improve the routing of calls between calling platforms, calls are often provided from the origination calling platform to a call management platform for forwarding to the destination calling platform, which in turn handles delivery of the call to the intended destination device within that destination call platform. The call management platform described herein may also be referred to as a call management system or a call processing platform or a call processing system.

In certain scenarios, the call management platform may provide additional functionality, such as determining the correct destination calling platform, appropriately decoding the call as provided by the origination calling platform, and appropriately encoding the call for provision to the destination calling platform. Receipt and delivery of a call may be considered as a real time or a continuous transmission of data as the call proceeds, even if there are brief interruptions of the data (e.g., delays in data transmission, lost packets, load balancing delays, etc.).

Embodiments described herein can be implemented by one or more entity computing devices, systems, networks, or platforms that are utilizes to handle or forward calls between a sender device (also referred to as an origination device) and a recipient device (also referred to as a destination device), including: carriers, interconnect vendors, over-the-top service providers, aggregators, or the like. The present disclosure is directed to techniques for providing additional functionality related to processing intra- and inter-platform calls, such as by analyzing calls to detect unwanted or potentially fraudulent calls from safe or legitimate calls. In general, an unwanted call or potentially fraudulent call is a call that is unintended or unwanted by the recipient, intended to extort or obtain information from the recipient, designed to harm or impact the recipients computing system, threatening or considered to be threatening to people or computing systems, etc. Such calls may attempt to harm the recipient, harass the recipient, or gain the trust or confidence of the recipient for nefarious purposes.

As used herein, the terms "calling platform" or "call processing provider" or "call processing entity" as used herein may be used interchangeably and refer to an entity or computing system that facilitates the reception, forwarding, processing, or dissemination of calls between an origination device and a destination device. Such calling platforms may include carrier networks or non-carrier networks (e.g., service providers, aggregators, company or brand computing devices, or other entities). In some embodiments, a calling platform may be a private network associated with a carrier, such as may be used by that carrier to provide its telephony, data transmission, and messaging services (e.g., in P2P communications). In other embodiments, the calling platform may be a computing device or system that can generate or send automated calls to other computing devices (e.g., in M2P communications or in A2P communications). It will be appreciated that depending on the identities and affiliations of a call origination device and the intended call destination device associated with a given intra- or inter-platform communication, calling platforms may operate as an origination calling platform, a destination calling platform, or an intermediate forwarding calling platform, or a combination thereof, at any time. Calling platforms can therefore include one or more private networks, one or more public networks, or some combination thereof.

As used herein, the term "carrier" refers to a provider of telecommunication services (e.g., telephony, data transmission, and messaging services) to its client subscribers. Non-limiting examples of such carriers operating within the United States may include Verizon Wireless, provided mainly by Verizon Communications Inc. of Basking Ridge, NJ; AT&T Mobility, provided by AT&T Inc. of DeKalb County, GA.; Sprint, provided by Sprint Nextel Corporation of Overland Park, KS.; T-Mobile, provided by Deutsche Telecom AG of Bonn, Germany; Facebook and/or Facebook messenger, provided by Facebook Inc. of Menlo Park, Ca; Twitter, provided by Twitter Inc. of San Francisco, CA; WhatsApp, provided by WhatsApp Inc. of Menlo Park, CA; Google+, provided by Google Inc. of Mountain View, CA; SnapChat, provided by Snap Inc. of Venice, CA, and the like.

The term "call" or "phone call" or "telephone call" may be used interchangeably and as used herein refers to audio signals sent by a sender to a recipient, and may be used interchangeably with respect to "communication" herein unless the context clearly dictates otherwise. A call may include audio data alone or it may include audio and video data (e.g., as a video call). Moreover, a call may include audio data sent as a message, such as a voicemail or audio message, or an MMS message having audio data. The sender or recipient of a call may be a person, a machine, or an application, and may be referred to as the origination device and the destination device, respectively. Thus, calls may be communications sent by one person to another person, communications sent by a machine or application to a person, etc. Because calls can be bi-directional, the sender or origination device refers to the person, device, or entity that initiated the call and the recipient or destination device refers to the person, device, or entity that accepts a call initiated by the sender or origination device.

Non-limiting examples of transmission types for such communications include VOIP (Voice Over Internet Protocol) calls, POTS (Plain Old Telephone Service) calls, public switched telephone networks, private branch exchange telephone networks, or other public or private networks that can transmit data to enable a call. The term "person" as used herein refers to an individual human, a group, an organization, or other entity.

The term "customer environment" or "customer platform" or "customer computing device" as used herein may be used interchangeably and refer to an entity associated with the reception, transmission, or dissemination of calls between an origination device associated with an origination calling platform and a destination device associated with a destination calling platform, where the customer utilizes a call management platform, as described herein, to classify and manage calls. Accordingly, the customer may be a carrier, the origination calling platform, the destination calling platform, an aggregator, over-the-top service providers, brand, enterprise, or other calling platform or entity that is utilizing the call management platform described herein. Such entities may be referred to as "users," "customers," or "clients" of the call management platform as described herein. Accordingly, a user, a customer, or a client refers to a person, individual, group entity, organization, or calling platform interacting with the call management platform that is used or implemented by a customer environment, including past, future or current users of such a system.

FIG. 1 is a schematic diagram of a networked environment that includes a call management platform in accordance with techniques described herein. Environment 100 includes an origination device 106, an origination calling platform 110, a customer environment 102, a destination calling platform 112, and a destination device 114. Although the origination device 106 and the destination device 114 are illustrated as individual devices, embodiments are not so limited and one or more origination devices or one or more destination devices may be utilized (e.g., in a group call, three-way call, or other conference call). Similarly, embodiments may include one or more origination calling platforms or one or more destination calling platforms.

The customer environment 102 may be part of an origination calling platform 110, a destination calling platform 112, an aggregator, an over-the-top service provider, or other entity associated with the transmission or handling of a calling from the origination device 106 on the origination calling platform 110 to one or more destination devices 114 on one or more destination calling platforms 112.

The customer environment 102 includes a call management platform 104. The call management platform 104 facilitates the receipt, analysis, and transmission of calls between two or more devices on one or more calling platforms. As discussed herein, the origination device 106 initiates a call to a destination device 114. The customer environment 102 receives an incoming call from the origination calling platform 110 and provides it to the call management platform 104.

The call management platform 104 performs embodiments described herein to analyze or monitor the call using several levels of fusion or multimodality architectures and to label the call as potentially fraudulent or as a safe or legitimate call. In some embodiments, the call management platform 104 analyzes the audio signal of the call prior to forwarding the call to towards the destination device 114 to connect or establish the bi-directional communication of the call. In other embodiments, the call management platform 104 operates in a streaming mode, where pre-trained models are used for real-time analysis of the audio signal of the call after the call has been connected with the destination device 114 and the bi-directional communication of the call has been established. In at least one embodiment, the call management platform 104 may utilize this streaming mode for performing real-time analysis as a voicemail is being recorded. In yet other embodiments, the call management platform 104 may operate in an offline or full-context mode, where the call is subsequently analyzed after it is finished, which can take into account audio and textual content of the entire call.

The call management platform 104 analyzes calls to detected unwanted, potentially fraudulent calls, or the caller's intent. Such unwanted calls may include, but are not limited to, spam calls, scam calls, robocalls, spoofing calls, identity theft calls, calls from some benevolent callers, some informational calls, and various other types.

Robocalls are generally phone calls through which a prepared voice message is sent from the origination device 106 to the destination device 114 (i.e., the callee). The prepared voice message may have been created by recording a person or by using a Text-To-Speech system. In some instances, some robocalls may not be unwanted. For example, purely informational messages, such as flight details, appointment reminders, or school information, may want to be received by the recipient of the destination device 114. Some other Robocalls may be unwanted, but may be legal in some jurisdictions, such as debt collection robocalls, political calls, calls from health care providers, or calls from verified charities. In some embodiments, users may be enabled to customize the call management platform to block, prevent, or disconnect these legal but unwanted calls along with calls that are considered spam, scams, or fraudulent.

Scam calls may include P2P spam calls, where the caller of the origination device 106 is a physically present person who can speak 1-on-1 with the callee of the destination device 114. One example of this type of spam call is a telemarketer. Spam calls may also include voice scams, also referred to as "vishing" (from the words "voice" and "phishing"). These calls are, for example, attempts to defraud or intimidate someone into sending money or giving confidential financial information (about credit cards or bank accounts), or providing unauthorized remote access to the destination device 114 or some other computing device. Typical vishing categories are debt reliefs, credit repairs, business, investments, charities, extended car warranties, "free" trials, loans, lotteries, and travels.

Scam calls may also include Wangiri scams. Wangiri, meaning 'one (ring) and cut' in Japanese, is a scam where criminals make short-duration (unanswered) calls and thus try to trick the callee into calling back, usually to premium-rate numbers overseas. Ringless voicemail (direct-to-voicemail) scams also try to get the callee to call back by recording a voice messages with a call-back number directly into the callee's voicemail.

Any of these Robocalls, spam calls, or scam calls can be presented in a number of different ways. For example, phone-number spoofing are scams where caller identifier information is falsified. The scam phone number can be falsified to be a local area code and number, an existing company, or a government agency.

Other types of unwanted calls may also be received. For example, some scams begin with a silent portion, or prerecorded audio message with strange and undefined background sound, to gather information about the callee, e.g., the callee saying "hi" or coughing or otherwise trying to engage with the caller. Any sound by the callee can reveal that the callee's number is active and answered by a human. This information can then being sold to criminals, who use it to exploit other scam, spam, or robocall techniques to get personal information, steal the callee's identity, or otherwise defraud the callee. In other scam calls, the caller uses a prerecorded message or an actual human to ask "Can you hear me?" or similar phrases to get an affirmative answer: "Yes" from the callee. Again, such confirmation may leave people on the hook for more nuisance calls and sometimes, if this "yes" is being recorded, even for unauthorized charges to their credit card or account.

If the call is identified as unwanted or potentially fraudulent, then the call may be blocked or disconnected from further processing and transmission towards the destination device 114, or the call may simply be identified as potentially fraudulent for further processing or future blocking. If, however, the call is labeled as safe, then the call management platform 104 processes and forwards the call to the appropriate destination calling platform 112 for dissemination to the appropriate destination device 114.

Although embodiments are described herein as the call management platform 104 being part of the customer environment 102 that forwards calls from an origination calling platform 110 to a destination calling platform 112, embodiments are not so limited. In some embodiments the call management platform 104 may be included in or executed on a user's device, such as destination device 114. In this way, calls can be analyzed as described herein in real time by the user's destination device 114 or the user can have the call analyzed as described herein after the call is completed.

FIGS. 2A-2D illustrate system diagrams of various embodiments of the call management platform in accordance with techniques described herein. The modules described in these figures provide a fusion or multimodality architecture to label calls as wanted or unwanted, or to label calls with the caller's intent.

Figure 2A:
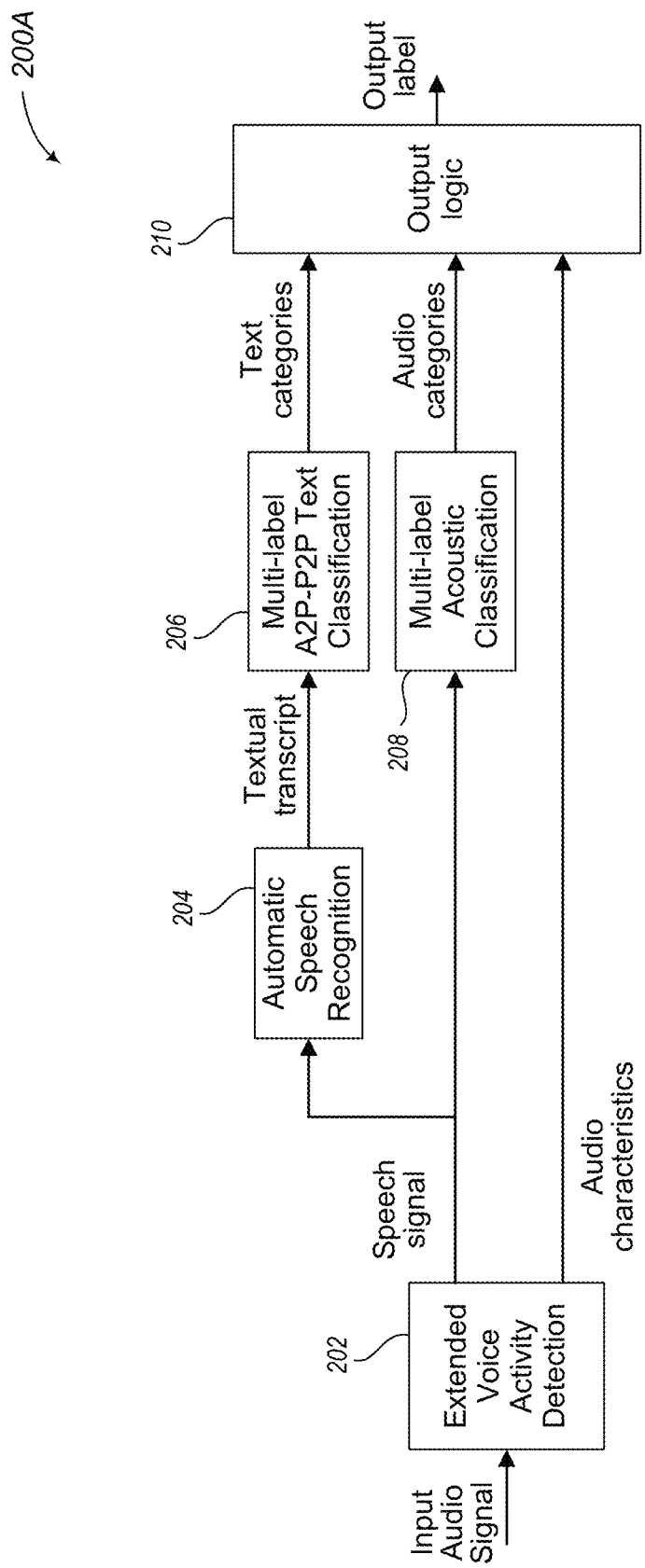
FIGS. 2A-2D illustrate system diagrams of various embodiments of the call management platform in accordance with techniques described herein.

FIG. 2A illustrates an example system 200A, which may be an embodiment of the call management platform 104 in FIG. 1. System 200A includes an extended voice activity detection module 202, an automatic speech recognition module 204, a multi-label A2P-P2P text classification module 206, a multi-label acoustic classification module 208, and an output logic module 210.

The extended voice activity detection module 202 is a subsystem that is configured to receive an input audio signal associated with a call. The audio signal, or audio stream, may be from the origination device 106 or from the destination device 114, or it may be combined audio signal from both devices. In some embodiments, if the call includes audio and visual data, the audio signal may be separated from the visual data for analysis by the extended voice activity detection module 202.

The extended voice activity detection module 202 is further configured to analyze the received audio signal for the presence of speech or other sounds. In response to detecting the presence of speech, the extended voice activity detection module 202 outputs a speech signal, which may include one or more portions or intervals of the audio signal that include the detected speech. In response to detecting the presence of other sounds, the extended voice activity detection module 202 outputs audio characteristics. These audio characteristics may include information about the presence of other sounds in the audio signal, such as mumbling, background noise, melodies, or other audible characteristics. The audio characteristics may also include information regarding the absence of sounds and noises in the audio signal (e.g., the extended voice activity detection module 202 may output audio characteristics indicating that the audio signal is silence or too short of a sample to be analyzed for speech).

In various embodiments, the extended voice activity detection module 202 employs one or more machine learning or other artificial intelligence techniques to identify or extract features from the audio signal. In some embodiments, the extended voice activity detection module 202 may be derived from a combination of machine learning models, deep learning models, or other types of speech or audio-feature extraction systems (e.g., a Root Mean Square detector) that are trained using known speech or audio characteristic samples.

The automatic speech recognition module 204 is a subsystem that is configured to receive the speech signal from the extended voice activity detection module 202. The automatic speech recognition module 204 is further configured to convert the speech signal to a text transcript. In some embodiments, the automatic speech recognition module 204 may be implemented as a classic machine learning model (e.g., a Hidden Markov Model) with feature extraction at the input and optional Language Model at the output. In other embodiments, the automatic speech recognition module 204 may be implemented as an end-to-end version with deep learning model (e.g., RNN-T (Transducer Recurrent Neural Network)). In yet other embodiments, the automatic speech recognition module 204 may be implemented as a combination of Convolutional Neural Networks and transformer-based architectures to generate a text transcript of the received speech signals from the audio signal. These different machine learning or artificial intelligence techniques may be generated or trained using known word, text, or phrase samples.

The multi-label A2P-P2P text classification module 206 is a subsystem that is configured to receive the text transcript from the automatic speech recognition module 204. The multi-label A2P-P2P text classification module 206 is further configured to perform classification on the text transcript to identify the possibility of one or more categorical A2P (application to person) and P2P (person to person) outputs. For example, the multi-label A2P-P2P text classification module 206 may classify the text transcript, and thus the call, as "Loan" and "Unexpected" or as "Travel" and "Reminder" or as some other combination of one or more classifications or categories. The multi-label A2P-P2P text classification module 206 can then output these classifications or text categories to the output logic module 210. In various embodiments, the multi-label A2P-P2P text classification module 206 may be implemented using machine learning models or deep learning models (e.g., LSTM (Long Short-Term Memory) or BERT (Bidirectional Encoder Representations from Transformers)) that are trained using known text categories.

The multi-label acoustic classification module 208 is a subsystem that is configured to receive the speech signals from the extended voice activity detection module 202. The multi-label acoustic classification module 208 is configured to detect various audio or acoustic categories of the received speech signals. For example, the multi-label acoustic classification module 208 detects whether the caller associated with the audio signal of the call is a human or a robot (e.g., a synthetic voice or synthetic speech obtained by a Text-To-Speech system). The multi-label acoustic classification module 208 may also detect whether the call is a live call or a prerecorded voice message and whether the call is spontaneous speech or structured speech that is being read. In some other embodiments, the multi-label acoustic classification module 208 can determine whether the call is directed to identity theft (e.g., by using software voice conversion or imitation) or whether the call is directed to speech masking or depersonalization (e.g., pitch shifting, flattening, or spectral modification).

In various embodiments, the multi-label acoustic classification module 208 may be implemented using machine learning models or deep learning models trained using known audio category samples. In some embodiments, the multi-label acoustic classification module 208 may output a single audio category to the output logic module 210. In other embodiments, the multi-label acoustic classification module 208 may output multiple audio categories to the output logic module 210. In some other embodiments, the multi-label acoustic classification module 208 may provide continuous audio category outputs to the output logic module 210 as a call progresses and changes (e.g., a prerecorded message followed by a real person that joins the call in response to the callee saying "hello").

The output logic module 210 is a subsystem that is configured to receive the text categories from the multi-label A2P-P2P text classification module 206, the audio categories from the multi-label acoustic classification module 208, and the audio characteristics from the extended voice activity detection module 202. The output logic module 210 is configured to utilize the received data in a multimodality formulation to generate an output label that identifies the call associated with the input audio signal as unwanted or wanted. In various embodiments, the output logic module 210 may employ one or more probability thresholds when identifying or labeling a call as wanted or unwanted. In such embodiments, the output logic module 210 may output this probability. In some embodiments, the customer of the customer environment 102 that is utilizing the call management platform 104 can select or modify these probability thresholds for one or more types of calls. For example, a customer may decrease the probability threshold to more easily identify a call as unwanted when the caller is a synthetic voice.

In various embodiments, the output logic module 210 can determine a caller's positive intent or negative intent. Positive intent refers to a positive, wanted, or acceptable purpose of the caller, such as a friend calling, a store calling a customer to notify them that their purchased item is ready for pick up, etc. Negative intent refers to a negative, unwanted, deceptive, mischievous, or fraudulent purpose of the caller, such as a spam or scam call, the caller trying to defraud the callee, voice phishing, etc. Detection of the caller's intent can be used to determine a motive of the caller and how to process the call. For example, detection of a negative intent can indicate that the call is unwanted and thus blocked. Conversely, detection of a positive intent can enable the call to proceed. The positive intent can also be used to prioritize the call or level of attention of the caller.

In some embodiments, the output label may also include additional details regarding one or more lower-level decisions that resulted in the final output label. In various embodiments, the output label may identify the type of unwanted call, such as spam, scam, fraud, vishing, etc. The output label may also include additional details regarding the type of call. For example, the output label may indicate that the call is a scam call that is utilizing the "can you can hear me" technique or it is a silent call scam or it is a wangiri call or some other call scam.

The output logic module 210 may employ one or more rule-based techniques, fuzzy logic methods, machine learning models, or other artificial intelligence mechanisms trained using known text categories, known audio categories, or known audio characteristics, or some combination thereof. For example, the call may be identified as a robocall or a live human caller. Additional textual content may then be analyzed to determine whether the call is more likely to be wanted than unwanted. As one non-limiting example, a debt collection robocall may be legal (e.g., wanted) if the textual context of the call indicates that it is a notification of debt collection or illegal if the textual context of the call indicates the existence of an intention to sell services to lower debts.

In various embodiments, the output logic module 210 may generate the output label based on the probability of individual outputs (from text categories, audio categories, or audio characteristics) and historical data, or a combination of these outputs and historical data. For example, if the call is discussing vehicle-related information (e.g., a textual category), but historical data indicates that a synthetic voice caller (e.g., audio category or audio characteristics) statistically increases the likelihood of that call being fraudulent, then the system can modify (by raising or lowering) the certainty level of fraud output depending on whether the call is a synthetic voice or not. Furthering this example, the textual category may indicate that there is a high probability that the call is from the Automotive category, but the probability of whether it is an unwanted or illegal type of Automotive call (Fraud-Automotive), based on just text data, is under a fraudulent threshold. The audio category assigned or generated from the acoustic model, however, may indicate a high probability of a synthetic voice, which may increase the overall probability of the call being fraudulent. If this overall probability exceeds the fraudulent threshold, then the call may be labeled as unwanted.

In some embodiments, the output label may indicate a real-time probability of whether the call is wanted or unwanted as the call proceeds. For example, the output logic module 210 may output a probability indicating that a political call may be wanted (or at least legitimate) as the call starts. But if the textual information indicates a shift towards requesting identity information, then the output logic module 210 may modify the probability and output a higher probability of an unwanted call. This real-time analysis can enable the system to adapt and allow a callee to accept a call, but help determine if the call should be disconnected if it becomes more likely to be unwanted.

In some embodiments, the output logic module 210 may perform additional analysis or management of the number using other metadata or information regarding the call. For example, the output logic module 210 may perform an analysis of the call metadata or an analysis on the network traffic to determine if the caller is using number spoofing.

The output label can then be used to prevent or disconnect an unwanted call or to further enable transmission of a wanted call. Moreover, the output label may be analyzed by a user to determine if the label is correct, and this information can be used as feedback in the system to further improve the models or artificial intelligence mechanisms utilized by the output logic module 210.

Figure 2B:
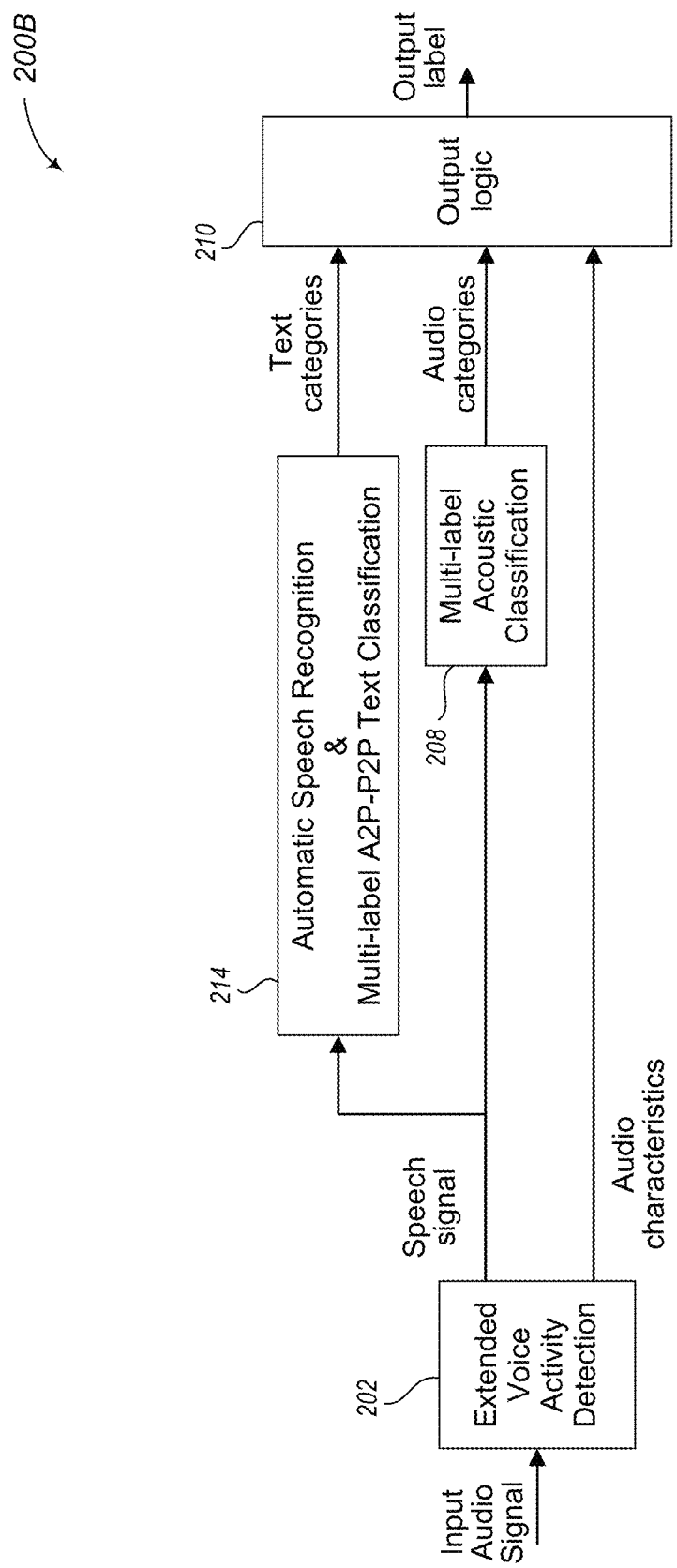

FIG. 2B illustrates an example system 200B, which may be an alternative embodiment of the call management platform 104 in FIG. 1. System 200B includes the extended voice activity detection module 202, the multi-label acoustic classification module 208, and the output logic module 210, as discussed in FIG. 2A. System 200B, however, includes an automatic speech recognition and a multi-label A2P-P2P text classification module 214.

Module 214 is a subsystem that is configured to receive the speech signal from the extended voice activity detection module 202. Module 214 is further configured to assign or generate an estimate of the textual categories based on the received speech signal, which are provided to the output logic module 210. In various embodiments, module 214 may be implemented by modifying a classical transformer-based text architecture, such as Bidirectional Encoder Representations from Transformers, on the (audio) speech domain. Compared to the classic cascading architecture, one advantage of this solution may include bypassing problems of automatic speech recognition word-level error at the junction of the cascade, i.e., a poor quality text transcript. In this way, the A2P-P2P classification can be improved in conditions of poorer speech signal quality (e.g., poorer signal-to-noise ratio, low voice quality, background noise and effects of speech coding and telephony in general).

The output logic module 210 may utilize the text categories from module 214, the audio categories from the multi-label acoustic classification module 208, and the audio characteristics from the extended voice activity detection module 202 to generate an output label, as discussed herein.

Figure 2C:
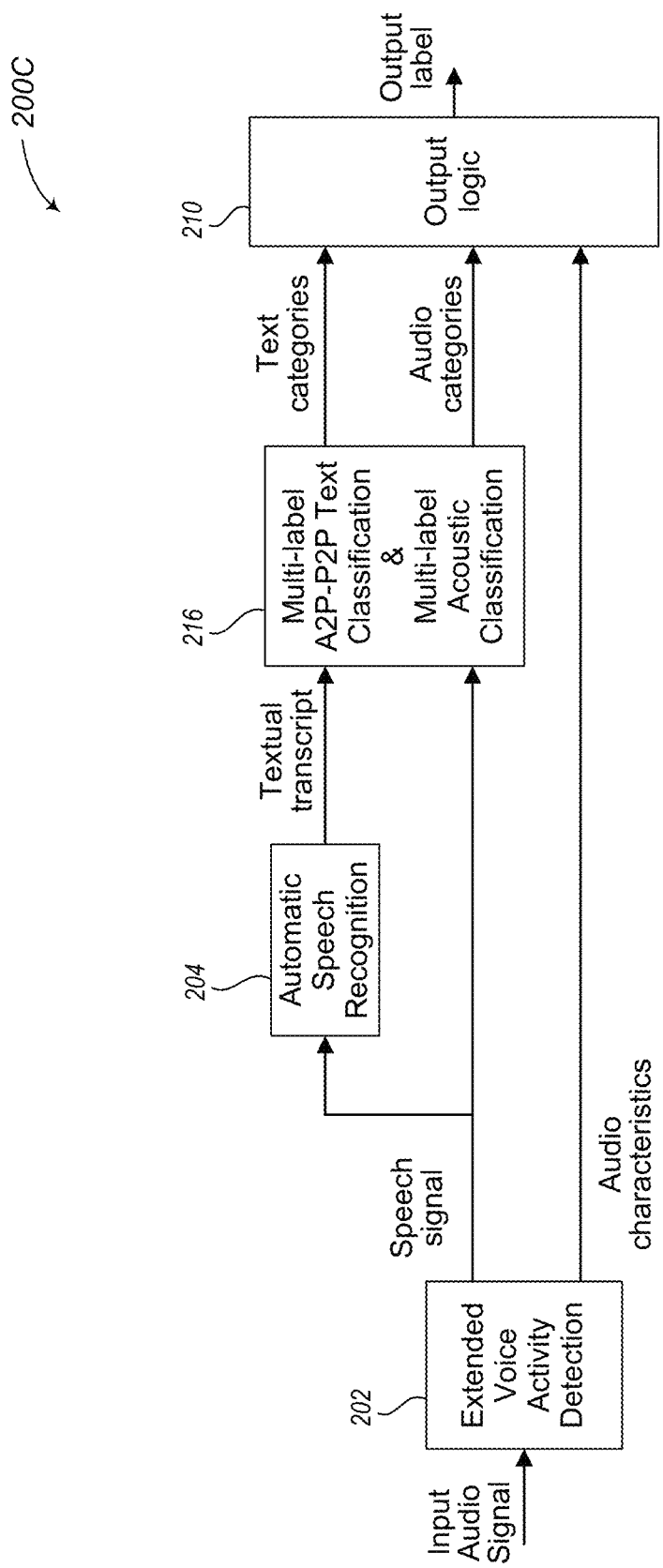

FIG. 2C illustrates an example system 200C, which may be another alternative embodiment of the call management platform 104 in FIG. 1. System 200C includes the extended voice activity detection module 202, the automatic speech recognition module 204, and the output logic module 210, as discussed in FIG. 2A. System 200C, however, includes a multi-label A2P-P2P text classification and multi-label acoustic classification module 216.

Module 216 is a subsystem that is configured to receive the textual transcript from the automatic speech recognition module 204 and the speech signal from the extended voice activity detection module 202. Module 216 is further configured to assign or generate an estimate of the textual categories and audio categories based on the received textual transcript and the received speech signal, which are provided to the output logic module 210.

Module 216 may employ machine learning models or deep learning models trained using known categories. In various embodiments, module 216 can include classification layers of the multi-label A2P-P2P text classification module 206 and the multi-label acoustic classification module 208, described in FIG. 2A, which are linked so that the characteristics of both the acoustic and textual layers affect the textual and audio classification outputs. For example, unspoken elements sensed from the speaker's tonality, intention, or emotion detected from the speech signal can be utilized with the text classification module to assign or generate the text categories. In some embodiments, two separate classifiers can be utilized and powered by a single feature set. In other embodiments, a single classifier having common classification layers may be utilized.

The output logic module 210 may utilize the text categories and the audio categories from module 216 and the audio characteristics from the extended voice activity detection module 202 to generate an output label, as discussed herein.

Figure 2D:
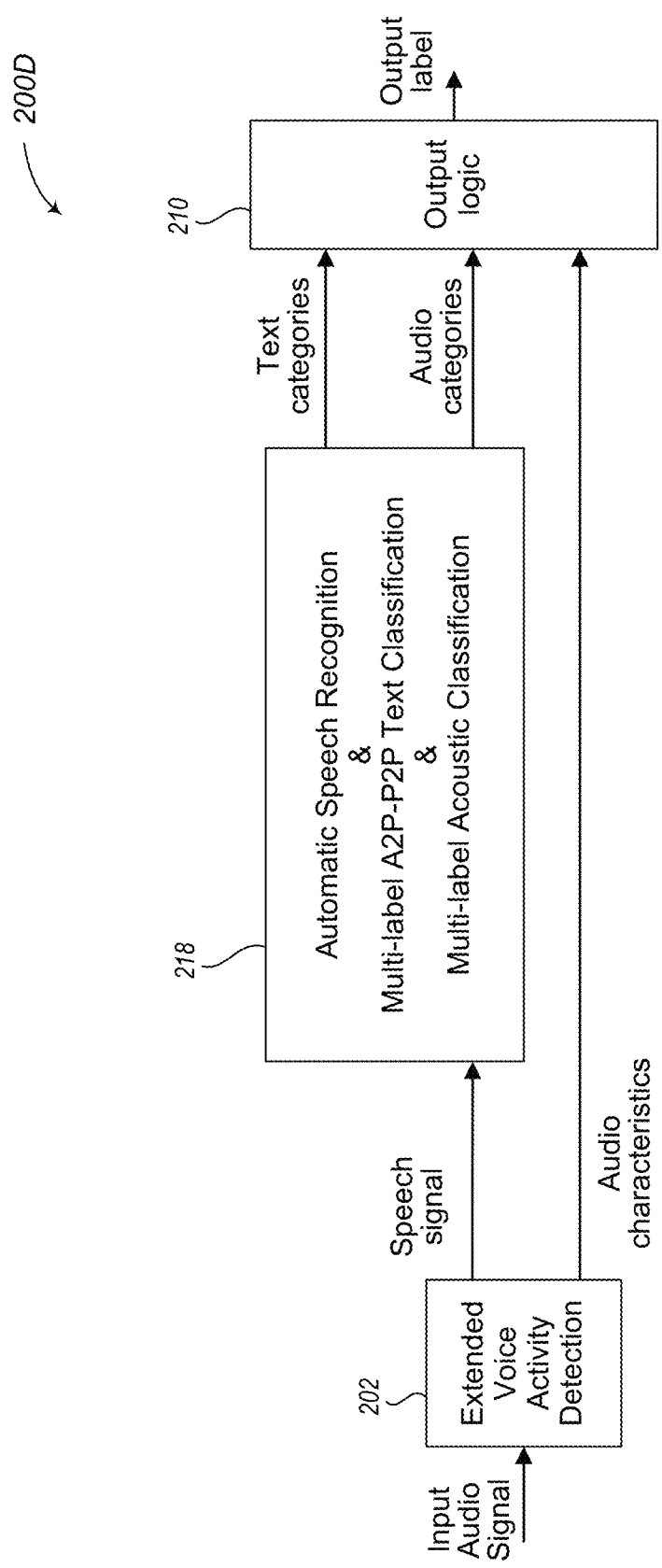

FIG. 2D illustrates an example system 200D, which may be yet another alternative embodiment of the call management platform 104 in FIG. 1. System 200D includes the extended voice activity detection module 202 and the output logic module 210, as discussed in FIG. 2A. System 200D, however, includes an automatic speech recognition and multi-label A2P-P2P text classification and multi-label acoustic classification module 218.

Module 218 is a subsystem that is configured to receive the speech signal from the extended voice activity detection module 202 and assign or generate the text categories and audio categories that are provided to the output logic module 210. In various embodiments, module 210 employs an acoustic-textual deep learning model that is trained using speech signals with known text categories and known audio categories.

The output logic module 210 may utilize the text categories and the audio categories from module 218 and the audio characteristics from the extended voice activity detection module 202 to generate an output label, as discussed herein.

Figure 3A:
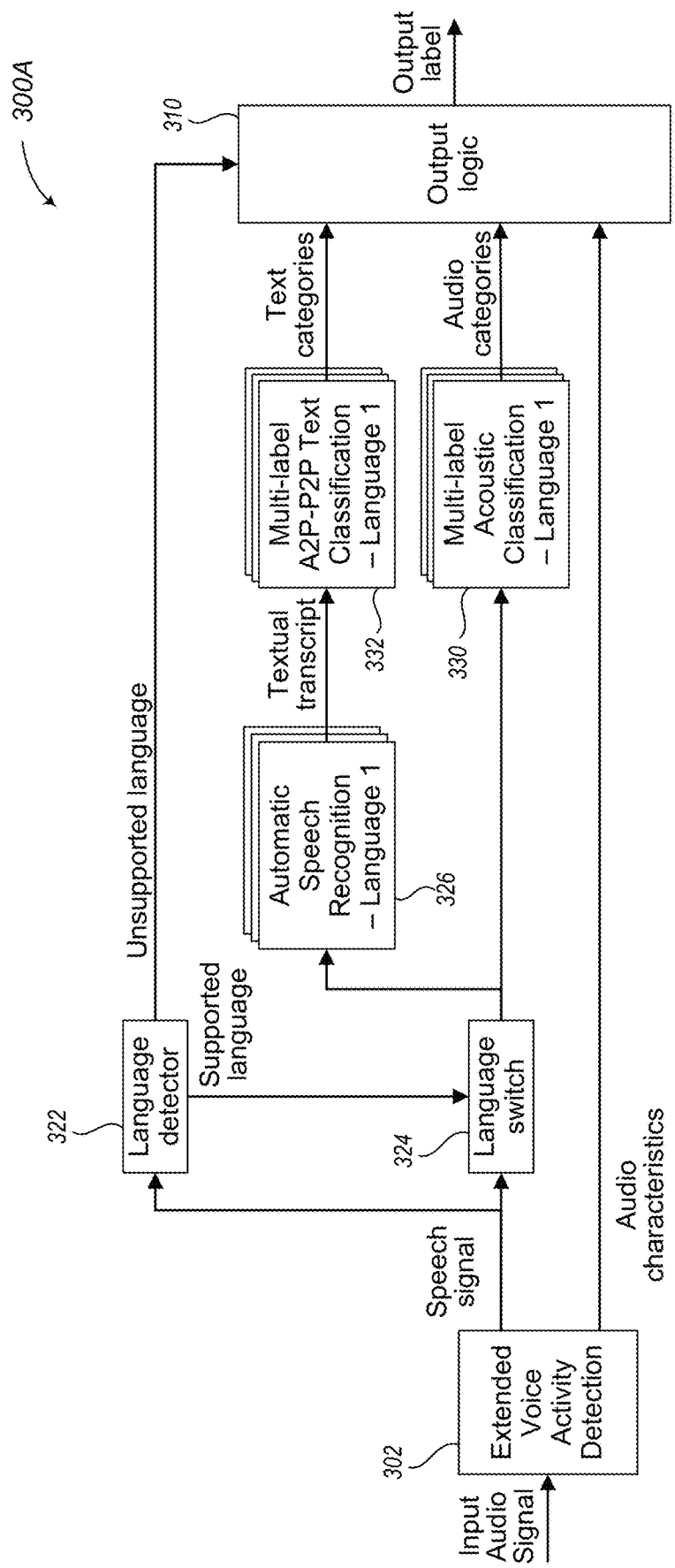
FIGS. 3A-3B illustrate system diagrams of various alternative embodiments of the call management platform in accordance with techniques described herein.
Figure 3B:
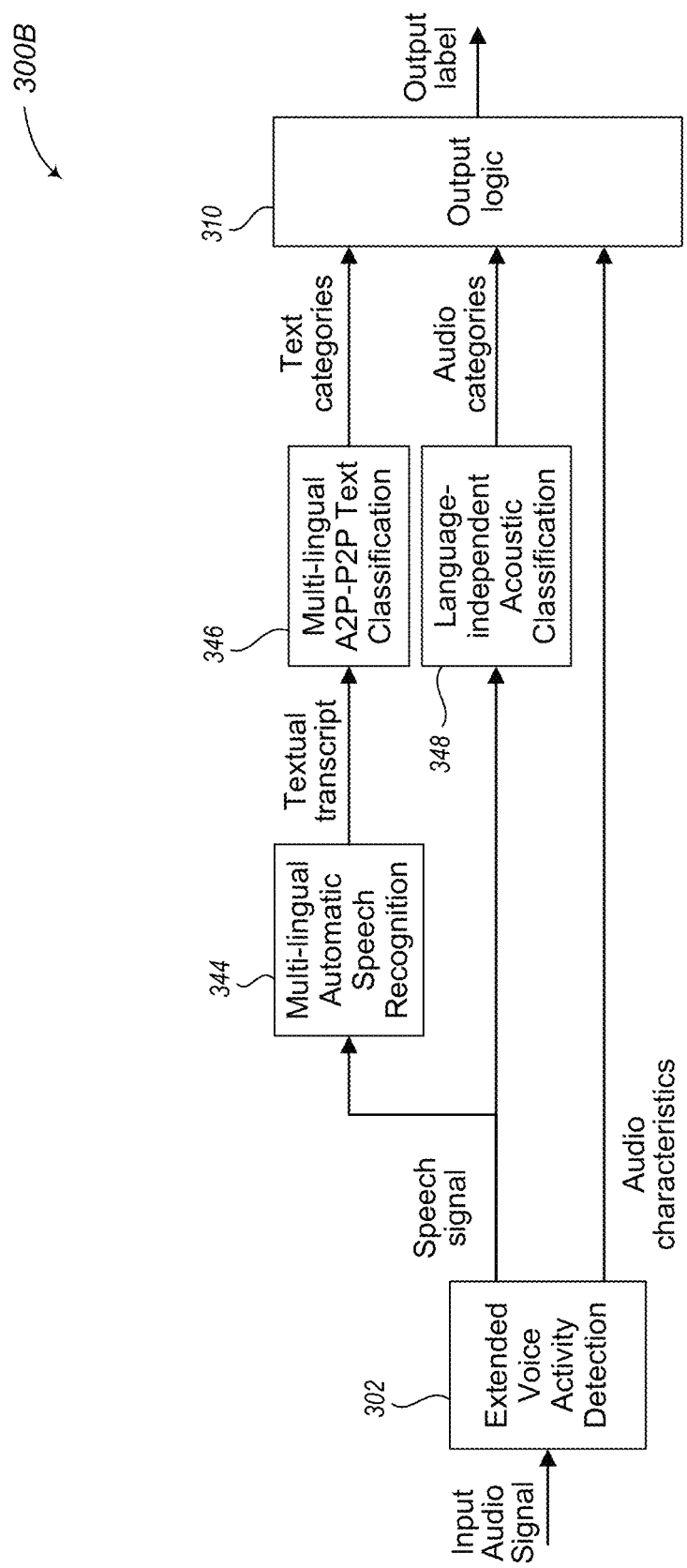

FIGS. 3A-3B illustrate system diagrams of various alternative embodiments of the call management platform in accordance with techniques described herein. The modules described in these figures provide a fusion or multimodality multi-lingual architecture to label calls as wanted or unwanted, or to label calls with the caller's intent.

FIG. 3A illustrates an example system 300A, which may be an embodiment of the call management platform 104 in FIG. 1. System 300A includes an extended voice activity detection module 302, a language detector 322, a language switch 324, an automatic speech recognition module 326, a multi-label A2P-P2P text classification module 332, a multi-label acoustic classification module 330, and an output logic module 310.

In various embodiments, the extended voice activity detection module 302 is an embodiment of the extended voice activity detection module 202 in FIG. 2A in which an input audio signal associated with a call is analyzed for the presence of speech or other sounds. In response to detecting the presence of speech, the extended voice activity detection module 302 outputs a speech signal, which may include one or more portions or intervals of the audio signal that include the detected speech. In response to detecting the presence of other sounds, the extended voice activity detection module 302 outputs audio characteristics.

The language detector 322 is a subsystem that is configured to receive the speech signal from the extended voice activity detection module 302 and identify a language associated with the call. In various embodiments, the language detector 322 may utilize one or more machine learning or deep learning techniques trained in known languages to detect the language of the call. If the detected language is not supported by system 300A, then the language detector 322 may output a notification to the output logic module 310 to indicate that the call cannot be properly analyzed because of the unsupported language. If the detected language is supported, then the language detector 322 notifies the language switch 324 of the detected language.

The language switch 324 utilized the detected language received from the language detector 322 to notify the automatic speech recognition module 326 and the multi-label acoustic classification module 330 of the detected language. In some embodiments, the automatic speech recognition module 326 and the multi-label acoustic classification module 330 may each utilize separate sub-modules to process different languages. The language switch 324 can then direct the speech signal from the extended voice activity detection module 302 to the appropriate language sub-module for the detected language.

The automatic speech recognition module 326 may employ embodiments described herein for the automatic speech recognition module 204 in FIG. 2A to generate a textual transcript for the call for different languages. In various embodiments, a plurality of sub-modules may be configured to each analyze the speech signal for a different supported language. Accordingly, the automatic speech recognition module 326 employs the appropriate sub-module to analyze the speech signal to generate the textual transcript for the detected language.

The multi-label A2P-P2P text classification module 332 may employ embodiments described herein for the multi-label A2P-P2P text classification module 206 in FIG. 2A to assign or generate a text categories from the textual transcript for the call for different languages. In various embodiments, a plurality of sub-modules may be configured to each analyze the textual transcript for a different supported language. Accordingly, the multi-label A2P-P2P text classification module 332 utilizes the appropriate sub-module for the detected language to assign or generate and output one or more text categories to the output logic module 310.

The multi-label acoustic classification module 330 may employ embodiments described herein for the multi-label acoustic classification module 208 in FIG. 2A to assign or generate audio categories from an analysis of the speech signal for the call for different languages. In various embodiments, a plurality of sub-modules may be configured to each analyze the speech signal for a different supported language. Accordingly, the multi-label acoustic classification module 330 utilizes the appropriate sub-module for the detected language to assign or generate and output one or more audio categories to the output logic module 310.

The output logic module 310 is an embodiment of the output logic module 210 in FIG. 2A to generate an output label for the call based on the text categories received from the multi-label A2P-P2P text classification module 332, the audio categories received from the multi-label acoustic classification module 330, and the audio characteristics received from the extended voice activity detection module 302.

FIG. 3B illustrates an example system 300B, which may be another alternative embodiment of the call management platform 104 in FIG. 1. System 300B includes the extended voice activity detection module 302 and the output logic module 310, which are similar to those modules discussed in FIG. 3A. System 300B also includes a multi-lingual automatic speech recognition module 344, a multi-lingual A2P-P2P text classification module 346, and a language-independent acoustic classification module 348. The output logic module 310 generates an output label for the call based on the text categories received from the multi-lingual A2P-P2P text classification module 346, the audio categories received from the language-independent acoustic classification module 348, and the audio characteristics received from the extended voice activity detection module 302.

In various embodiments, the multi-lingual automatic speech recognition module 344 may employ embodiments described herein for the automatic speech recognition module 204 in FIG. 2A to generate a textual transcript for the call for multiple languages. The multi-lingual automatic speech recognition module 344 may, however, utilize a single multi-lingual module to analyze the speech signal for a plurality of different supported languages.

In various embodiments, the multi-lingual A2P-P2P text classification module 346 may employ embodiments described herein for the multi-label A2P-P2P text classification module 206 in FIG. 2A to assign or generate a text categories from the textual transcript for the call for different languages. The multi-lingual A2P-P2P text classification module 346 may, however, utilize a single cross-lingual module to analyze the textual transcript for a plurality of different supported languages.

In various embodiments, the language-independent acoustic classification module 348 may employ embodiments described herein for the multi-label acoustic classification module 208 in FIG. 2A to assign or generate audio categories from an analysis of the speech signal for the call for different languages. The language-independent acoustic classification module 348 may, however, utilize a single multi-lingual module to analyze the speech signal for a plurality of different supported languages.

In various embodiments, models utilized by the multi-lingual automatic speech recognition module 344, the multi-lingual A2P-P2P text classification module 346, and the language-independent acoustic classification module 348 may be prepared in advance through one of the paradigms: zero-shot, few-shot or many-shot. These three paradigms differ in the number of samples in the target languages (e.g., French, Spanish, German and Chinese) during model preparation relative to the base language (e.g., English). Multi-lingualism, i.e., language independence of acoustic models, can be achieved by generating language-independent features, using multi-language architectures, or training the models using multi-language training data. Embodiments described herein may be combined in various forms to create hybrid solutions. Hybrid solutions include various combinations of language detection mechanisms with machine translation mechanisms, either language (conversion of text from one language to another) or speech (conversion of the audio speech signal from one language to another). In one non-limiting example, only models prepared for English may be used. Hybrid solutions also include various combinations of the different implementations of each subsystem described herein (monolingual and multilingual models).

Although FIGS. 2A-2D and 3A-3B discuss the use of various machine learning mechanisms that employ models trained using known data, embodiments are not so limited. In some other embodiments, one or more of the modules or components discussed herein may utilize unsupervised learning, clustering, or other learning techniques. As one non-limiting example, the multi-label A2P-P2P text classification module 206 in FIG. 2A may utilize a clustering technique to identify text categories or the multi-label acoustic classification module 208 may utilize a clustering technique to identify audio categories.

The operation of certain aspects will now be described with respect to FIG. 4. In at least one of various embodiments, process 400 described in conjunction with FIG. 4 may be implemented by or executed via circuitry or on one or more computing devices, such as call management platform 104 in FIG. 1. Moreover, one or more of the modules or components described in conjunction with FIGS. 2A-2D and 3A-3D may be utilized to perform one or more steps described in FIG. 4.

Although process 400 is generally described as being performed by the call management platform 104, embodiments are not so limited. In some embodiments, process 400 may be performed by a user device, such as destination device 114 in FIG. 1. As one non-limiting example, destination device 114 may include or execute an application such that the user can upload a suspicious call sample to the application. The application can then analyze the suspicious call sample as described herein, or it can provide the suspicious call sample to another computing device, to perform embodiments described herein.

Figure 4:
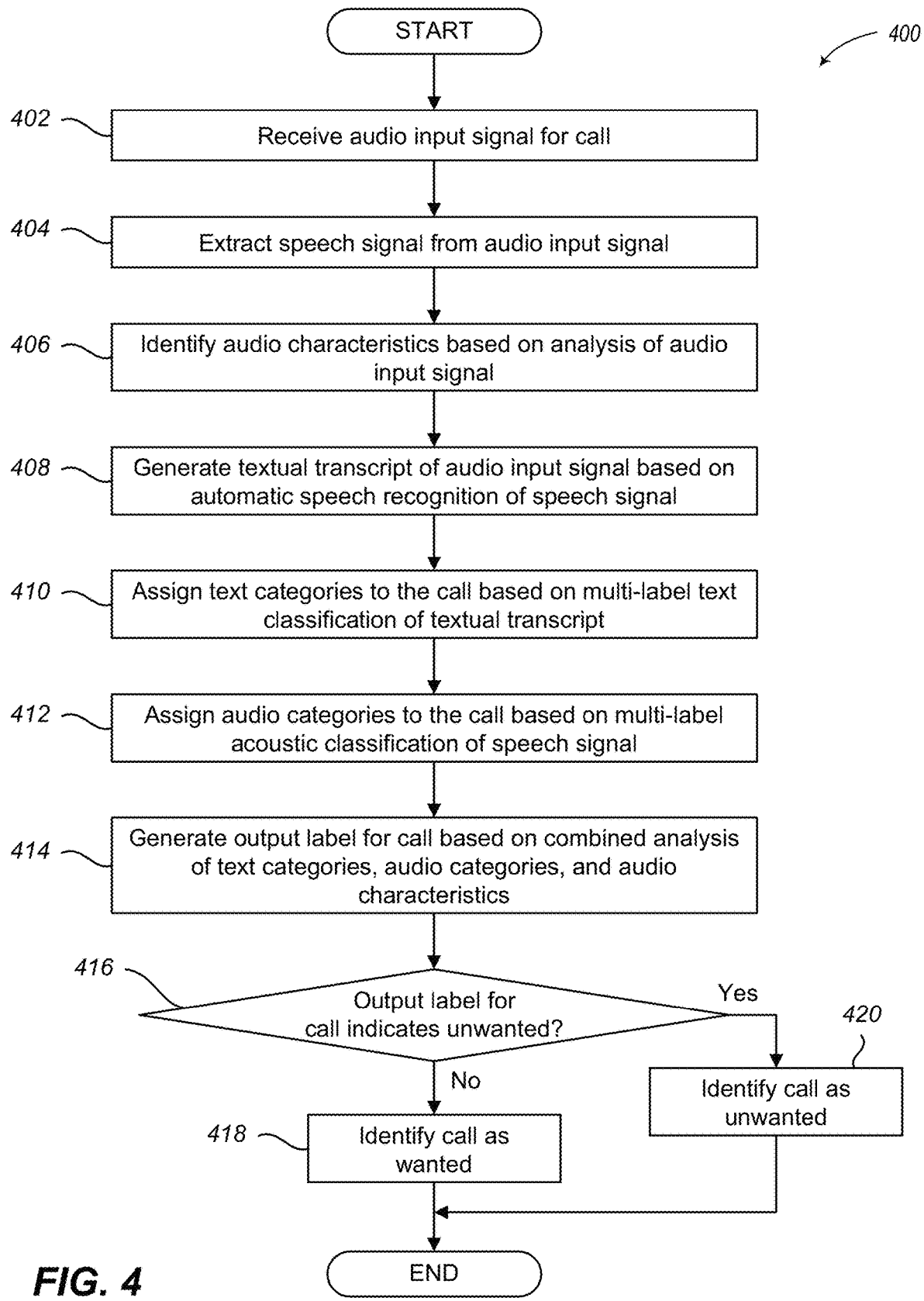
FIG. 4 illustrates a logical flow diagram showing a process for detecting if a call is unwanted in accordance with embodiments described herein.

FIG. 4 illustrates a logical flow diagram showing a process 400 for detecting if a call is unwanted or the caller's intent in accordance with embodiments described herein. Process 400 begins, after a start block, at block 402, where an audio input signal for a call is received. In various embodiments, the audio input signal may be received during the call, after the call is completed, or after the call is initialized but before it is connected.

Process 400 proceeds to block 404, where a speech signal is extracted from the audio input signal.

Process 400 continues at block 406, where audio characteristics are identified for the call bases on an analysis of the audio input signal.

Process 400 proceeds next to block 408, where a textual transcript of the audio input signal is generated based on automatic speech recognition of the speech signal.

Process 400 continues next at block 410, where text categories are assigned for the call based on a multi-label text classification of the textual transcript.

Process 400 proceeds to block 412, where audio categories are assigned for the call based on a multi-label acoustic classification of the speech signal.

Although blocks 408, 410, and 412 are shown as being performed sequentially, embodiments are not so limited. In some embodiments, blocks 408, 410, and 412 may be performed in a sequential order other than shown. In other embodiments, blocks 408, 410, and 412 may be performed in parallel. In yet other embodiments, two of blocks 408, 410, and 412 may be performed in parallel with the other block being performed sequentially. For example, block 412 may be performed in parallel with the sequential performance of blocks 408 and 410.

Process 400 continues at block 414, where an output label is generated for the call based on a combined analysis of the text categories, the audio categories, and the audio characteristics. In some embodiment, the output label may indicate that the call is wanted or unwanted. In other embodiments, the output label may indicate that the caller's intent is a positive intent or a negative intent.

Process 400 proceeds next to decision block 416, where a determination is made whether the output label indicates that the call is unwanted. In various embodiments, the output label may explicitly label the call as wanted or unwanted. In other embodiments, the output label may identify a probability that the call is wanted or unwanted. In at least one such embodiment, one or more probability thresholds may be utilized to determine if the call is wanted or unwanted based on the output probability.

If the call is unwanted, then process 400 flows from decision block 416 to block 420 where the call is identified as unwanted, which may include terminating the call, preventing the call from connecting, or otherwise re-enforcing the training of the system. After block 420, process 400 terminates or otherwise returns to a calling process to perform other actions.

If the call is wanted, then process 400 flows from decision block 416 to block 418 where the call is identified as wanted, which may include allowing the call to connect, allowing the call to continue, or otherwise re-enforcing the training of the system. After block 418, process 400 terminates or otherwise returns to a calling process to perform other actions.

Although decision block 416 is described as determining whether the output label indicates that the call is unwanted, embodiments are not so limited. In various embodiments, decision block 416 may also determine whether the caller's intent is positive or negative. If the caller's intent is negative, then the call may be identified as unwanted, which may include terminating the call, preventing the call from connecting, or otherwise re-enforcing the training of the system. If the caller's intent is positive, then the call may be identified as wanted, which may include allowing the call to connect, allowing the call to continue, or otherwise re-enforcing the training of the system.

In the context of FIG. 2A, the extended voice activity detection module 202 may perform embodiments of block 402, block 404, and block 406; the automatic speech recognition module 204 may perform embodiments of block 408; the multi-label A2P-P2P text classification module 206 may perform embodiments of block 410; the multi-label acoustic classification module 208 may perform embodiments of block 412; and the output logic module 210 may perform embodiments of block 414.

In the context of FIG. 2B, the extended voice activity detection module 202 may perform embodiments of block 402, block 404, and block 406; the automatic speech recognition and multi-label A2P-P2P text classification module 214 may perform embodiments of block 408 and block 410; the multi-label acoustic classification module 208 may perform embodiments of block 412; and the output logic module 210 may perform embodiments of block 414.

In the context of FIG. 2C, the extended voice activity detection module 202 may perform embodiments of block 402, block 404, and block 406; the automatic speech recognition module 204 may perform embodiments of block 408; the multi-label A2P-P2P text classification and multi-label acoustic classification module 216 may perform embodiments of block 410 and block 412; and the output logic module 210 may perform embodiments of block 414.

In the context of FIG. 2D, the extended voice activity detection module 202 may perform embodiments of block 402, block 404, and block 406; the automatic speech recognition and multi-label A2P-P2P text classification and multi-label acoustic classification module 218 may perform embodiments of block 408, block 410, and block 412; and the output logic module 210 may perform embodiments of block 414.

In the context of FIGS. 2A-2D, the output logic module 210 or other modules or components of the call management platform 104 may perform embodiments of decision block 416, block 418, and block 420.

In the context of FIG. 3A, the language detector module 322 detects the call language and the language switch controls which language module is used, both of which are not illustrated in FIG. 4; the extended voice activity detection module 302 may perform embodiments of block 402, block 404, and block 406; the automatic speech recognition module 326 may perform embodiments of block 408 for the call language; the multi-label A2P-P2P text classification module 332 may perform embodiments of block 410 for the call language; the multi-label acoustic classification module 330 may perform embodiments of block 412 for the call language; and the output logic module 310 may perform embodiments of block 414.

In the context of FIG. 3B, the extended voice activity detection module 302 may perform embodiments of block 402, block 404, and block 406; the multi-lingual automatic speech recognition module 344 may perform embodiments of block 408; the multi-lingual A2P-P2P text classification module 346 may perform embodiments of block 410; the language-independent acoustic classification module 348 may perform embodiments of block 412; and the output logic module 310 may perform embodiments of block 414.

In the context of FIGS. 3A-3B, the output logic module 310 or other modules or components of the call management platform 104 may perform embodiments of decision block 416, block 418, and block 420.

Figure 5A:
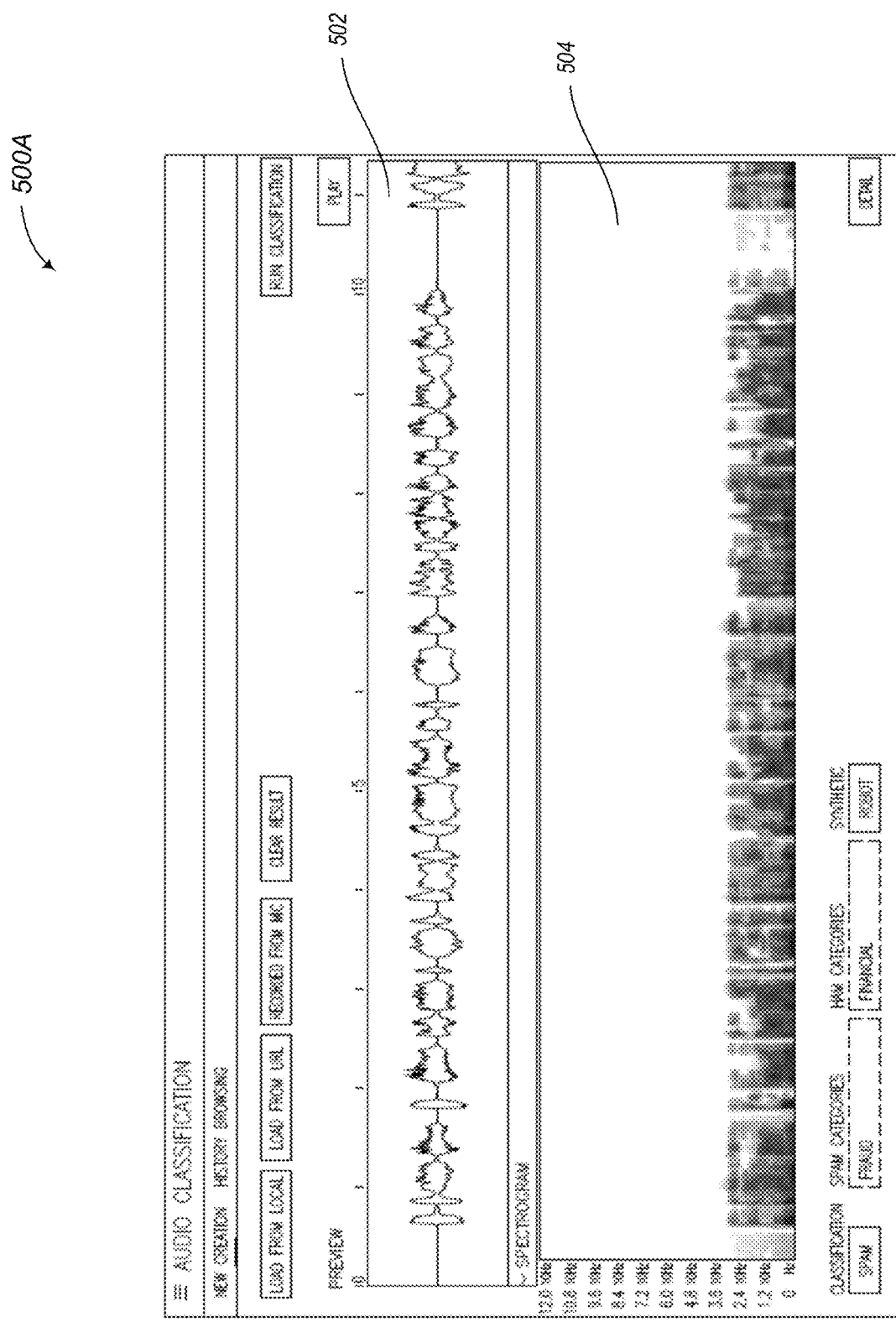

FIGS. 5A and 5B illustrate a graphical user interface showing functional embodiments of the call management platform in accordance with embodiments described herein. Interface 500A in FIG. 5A illustrates an input audio signal 502 that is associated with a call, as described herein. Interface 500A also shows graph 504, which depicts a spectrogram of the input audio signal as generated by the call management platform 104 to detect unwanted calls. Interface 500B in FIG. 5B illustrates a list of output labels for multiple calls, as described herein. As illustrated, one or more details regarding the calls are shown, which can be used to block, terminate, or allow calls.

Figure 6A:
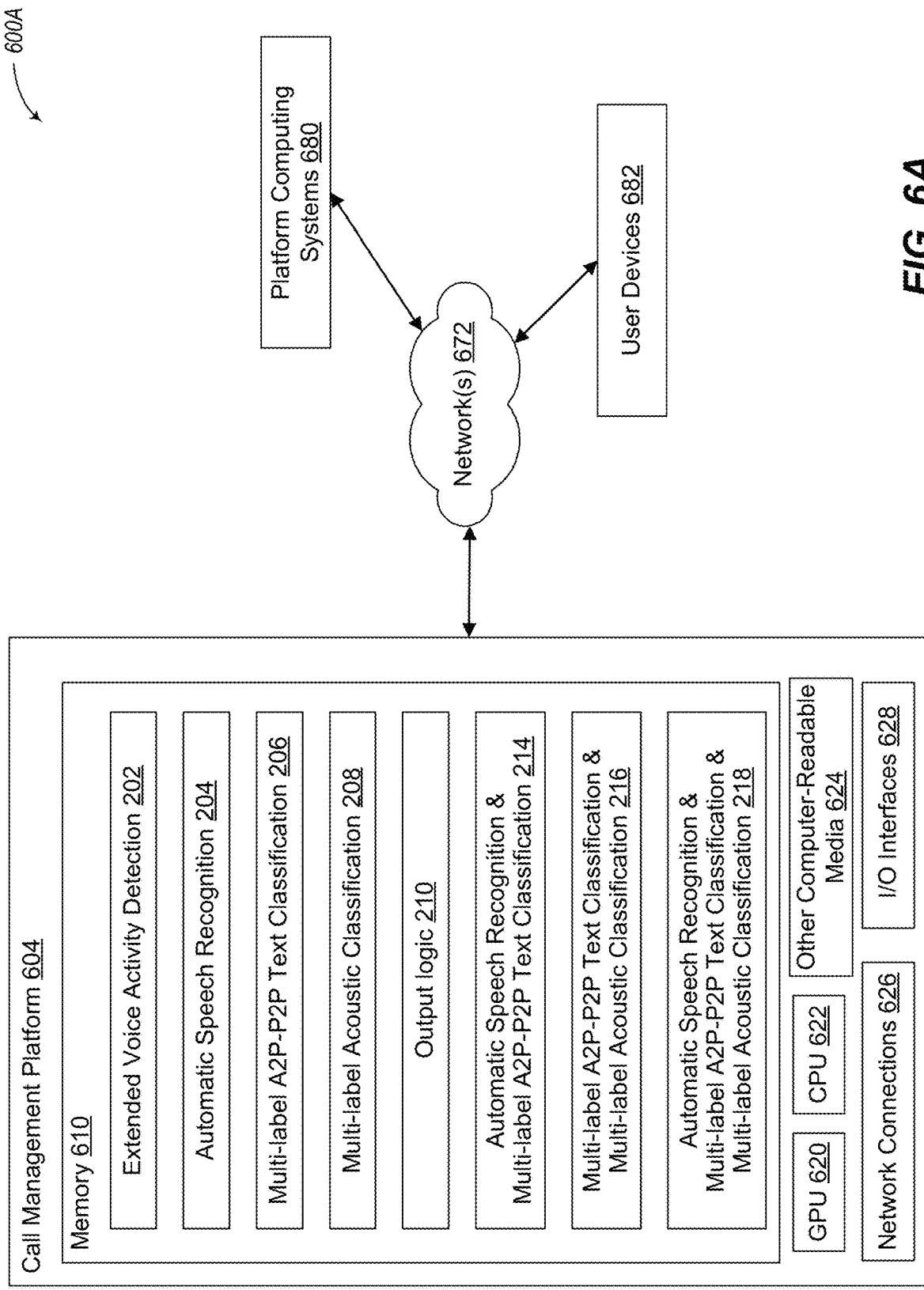
FIGS. 6A and 6B show system diagrams that describe various implementations of computing systems for implementing embodiments described herein.
Figure 6B:
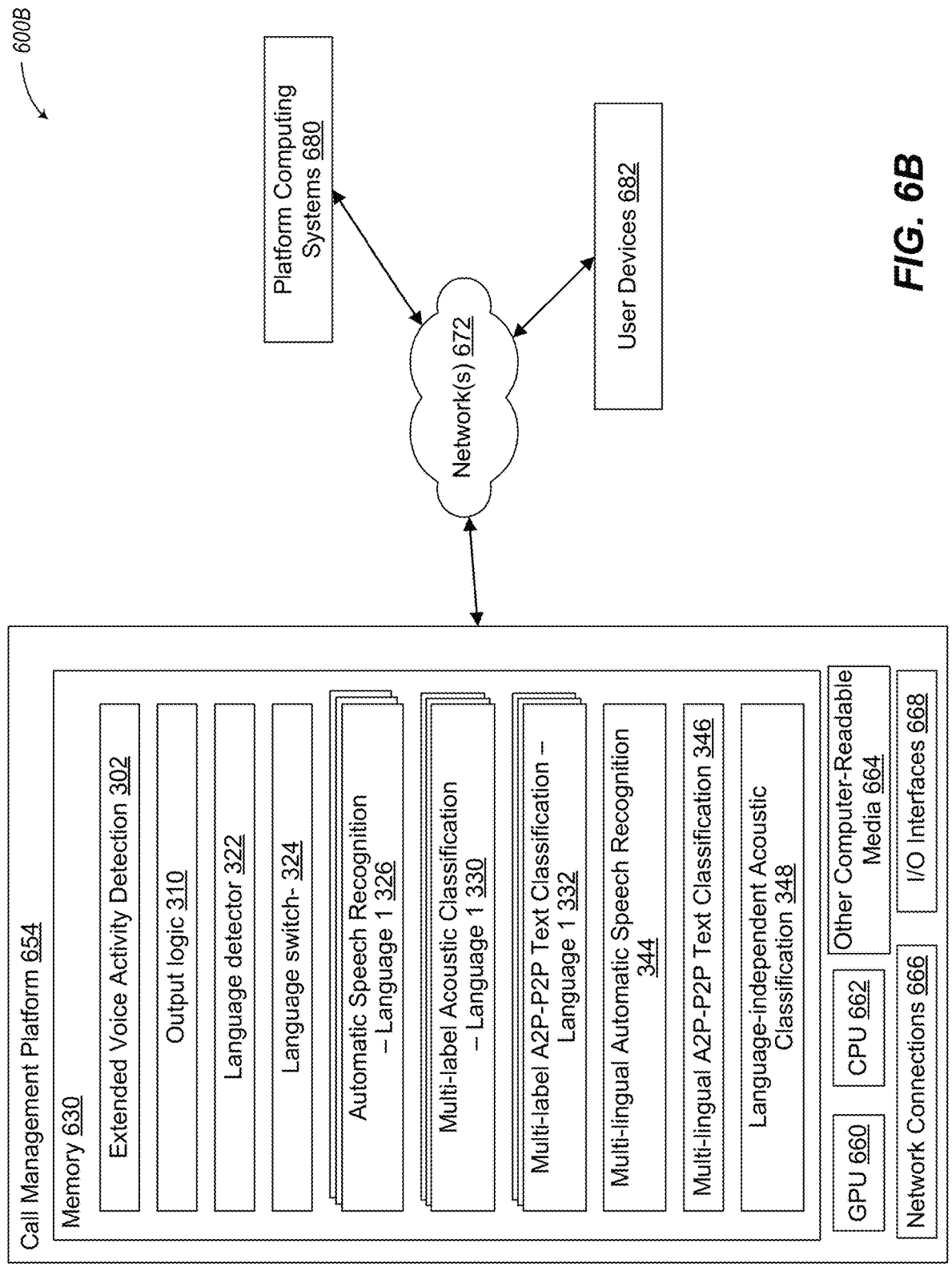

FIGS. 6A and 6B show system diagrams that describe various implementations of computing systems for implementing embodiments described herein. FIG. 6A shows example system 600A, which includes a call management platform 604, one or more platform computing systems 680, and a plurality of user devices 682. The call management platform 604 may be an embodiment of the call management platform 104 in FIG. 1, which may employ embodiments of FIGS. 2A-2D. In some embodiments, platform computing systems 680 may include origination calling platform 110 or destination calling platform 112 in FIG. 1. Moreover, user devices 682 may include origination device 106 or destination device 114 in FIG. 1.

Call management platform 604 receives calls from user devices 682 via platform computing systems 680. The calls may be transmitted between the separate systems via network 672. The network 672 is configured to couple various computing devices to transmit calls from one or more devices to one or more other devices. For example, network 672 may be the Internet, X.25 networks, or a series of smaller or private connected networks that carry the data associated with a call, or other public or private call networks. Network 672 may include one or more wired or wireless networks.

One or more special-purpose computing systems may be used to implement call management platform 604. Accordingly, various embodiments described herein may be implemented in software, hardware, firmware, or in some combination thereof. Call management platform 604 may include memory 610, one or more central processing units (CPUs) 622, one or more graphical processing units (GPUs) 620, Input/Output (I/O) interfaces 628, other computer-readable media 624, and network connections 626.

Memory 610 may include one or more various types of non-volatile and/or volatile storage technologies. Examples of memory 610 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 610 may be utilized to store information, including computer-readable instructions that are utilized by CPU 622 to perform actions, including embodiments described herein. In various embodiments, CPU 622 or GPU 620, or some combination thereof, may perform embodiments described herein.

Memory 610 may have stored thereon one or more different combinations of modules to perform embodiments described herein. For example, in some embodiments, memory 610 may store the extended voice activity detection module 202, the automatic speech recognition module 204, the multi-label A2P-P2P text classification module 206, the multi-label acoustic classification module 208, and the output logic module 210, as described herein in conjunction with FIG. 2A. In this scenario, the automatic speech recognition and multi-label A2P-P2P text classification module 214, the multi-label A2P-P2P text classification and multi-label acoustic classification module 216, and the automatic speech recognition and multi-label A2P-P2P text classification and multi-label acoustic classification module 218 may be optional and may not be included.

In other embodiments, memory 610 may store the extended voice activity detection module 202, the multi-label acoustic classification module 208, the automatic speech recognition and multi-label A2P-P2P text classification module 214, and the output logic module 210, as described herein in conjunction with FIG. 2B. In this scenario, the automatic speech recognition module 204, the multi-label A2P-P2P text classification module 206, the multi-label A2P-P2P text classification and multi-label acoustic classification module 216, and the automatic speech recognition and multi-label A2P-P2P text classification and multi-label acoustic classification module 218 may be optional and may not be included.

In yet other embodiments, memory 610 may store the extended voice activity detection module 202, the automatic speech recognition module 204, the multi-label A2P-P2P text classification and multi-label acoustic classification module 216, and the output logic module 210, as described herein in conjunction with FIG. 2C. In this scenario, the multi-label A2P-P2P text classification module 206, the multi-label acoustic classification module 208, the automatic speech recognition and multi-label A2P-P2P text classification module 214, and the automatic speech recognition and multi-label A2P-P2P text classification and multi-label acoustic classification module 218 may be optional and may not be included.

In some other embodiments, memory 610 may store the extended voice activity detection module 202, the automatic speech recognition and multi-label A2P-P2P text classification and multi-label acoustic classification module 218, and the output logic module 210, as described herein in conjunction with FIG. 2D. In this scenario, the automatic speech recognition module 204, the multi-label A2P-P2P text classification module 206, the multi-label acoustic classification module 208, the automatic speech recognition and multi-label A2P-P2P text classification module 214, and the multi-label A2P-P2P text classification and multi-label acoustic classification module 216 may be optional and may not be included.

I/O interfaces 628 may include one or more input or output interfaces to enable a customer to select or customize thresholds, select various machine learning modules, or to view output labels of calls, as described herein. Examples of such I/O interfaces 628 may include display interfaces, other video interfaces, keyboard, audio interfaces, or the like.

Other computer-readable media 624 may include other types of stationary or removable computer-readable media, such as removable flash drives, external hard drives, or the like.

Network connections 626 are configured to communicate with other computing devices, such as platform computing systems 680 via network 672.

Platform computing systems 680 and user devices 682 may include other computing components, such as a processor, memory, displays, network connections, input out/output interfaces, or the like, but they are not described herein for ease of illustration.

FIG. 6B shows example system 600B, which includes a call management platform 654, the one or more platform computing systems 680, and the plurality of user devices 682. The call management platform 654 may be an embodiment of the call management platform 104 FIG. 1, which may employ embodiments of FIGS. 3A-3B. In some embodiments, platform computing systems 680 may include origination calling platform 110 or destination calling platform 112 in FIG. 1. Moreover, user devices 682 may include origination device 106 or destination device 114 in FIG. 1.

The call management platform 654 receives calls from user devices 682 via platform computing systems 680, which may be transmitted between the separate systems via the network 672. One or more special-purpose computing systems may be used to implement call management platform 654. Accordingly, various embodiments described herein may be implemented in software, hardware, firmware, or in some combination thereof. Call management platform 654 may include memory 630, one or more central processing units (CPUs) 662, one or more graphics processing units (GPUs) 660, Input/Output (I/O) interfaces 668, other computer-readable media 664, and network connections 666.

Memory 630 may include one or more various types of non-volatile and/or volatile storage technologies, which may be similar to memory 610 in FIG. 6A. Memory 630 may be utilized to store information, including computer-readable instructions that are utilized by CPU 662 to perform actions, including embodiments described herein. In various embodiments, CPU 662 or GPU 660, or some combination thereof, may perform embodiments described herein.

Memory 660 may have stored thereon one or more different combinations of modules to perform embodiments described herein. For example, in some embodiments, memory 610 may store the extended voice activity detection module 302, the language detector 322, the language switch 324, the automatic speech recognition module 326, the multi-label A2P-P2P text classification module 332, the multi-label acoustic classification module 330, and the output logic module 310, as described herein in conjunction with FIG. 3A. In this scenario, the multi-lingual automatic speech recognition module 344, the multi-lingual A2P-P2P text classification module 346, and the language-independent acoustic classification module 348 may be optional and may not be included.

In other embodiments, memory 630 may store the extended voice activity detection module 302, the multi-lingual automatic speech recognition module 344, the multi-lingual A2P-P2P text classification module 346, the language-independent acoustic classification module 348, and the output logic module 310, as described herein conjunction with FIG. 3B. In this scenario, the language detector 322, the language switch 324, the automatic speech recognition module 326, the multi-label A2P-P2P text classification module 332, the multi-label acoustic classification module 330 may be optional and may not be included.

I/O interfaces 668 may include one or more input or output interfaces to enable a customer to select or customize thresholds, select various machine learning modules, or to view output labels of calls, as described herein. Examples of such I/O interfaces 668 may include display interfaces, other video interfaces, keyboard, audio interfaces, or the like.

Other computer-readable media 664 may include other types of stationary or removable computer-readable media, such as removable flash drives, external hard drives, or the like.

Network connections 666 are configured to communicate with other computing devices, such as platform computing systems 680 via network 672.

Platform computing systems 680 and user devices 682 may include other computing components, such as a processor, memory, displays, network connections, input out/output interfaces, or the like, but they are not described herein for ease of illustration.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving an audio signal associated with a call;
   extracting a speech signal from the audio signal;
   identifying audio characteristics based on an analysis of the audio signal;
   generating a textual transcript of the audio signal based on automatic speech recognition of the speech signal;
   assigning text categories for the call based on an automated multi-label textual classification of the textual transcript;
   assigning audio categories for the call based on an automated multi-label acoustic classification of the speech signal; and
   generating an output label for the call based on a combined analysis of the text categories, the audio categories, and the audio characteristics.

2. The method of claim 1, further comprising:
   determining that the output label identifies the call as unwanted; and
   in response to determining that the call is unwanted, terminating the call.

3. The method of claim 1, further comprising:
   determining that the output label identifies the call as wanted; and
   in response to determining that the call is wanted, forwarding the call to a destination device.

4. The method of claim 1, further comprising:
   determining that the output label identifies the call as wanted; and
   in response to determining that the call is wanted, labeling a caller of the call as a non-spammer.

5. The method of claim 1, wherein generating the output label for the call comprises:
   analyzing the text categories, the audio categories, and the audio characteristics using a machine learning model trained from training text category data, training audio category data, and training audio characteristic data; and employing the machine learning model to generate the output label indicating a probability that the call is unwanted.

6. The method of claim 1, wherein assigning the text categories for the call comprise:

employing a modified classical transformer-based text architecture on the speech signal to assign the text categories, wherein the modified classical transformer-based text architecture includes functionalities from the automatic speech recognition and the automated multi-label textual classification.

7. The method of claim 1, wherein assigning the text categories for the call and assigning the audio categories for the call comprise:

employing a machine learning model or a deep learning model having acoustic layers and textual layers on the speech signal and the textual transcript to assign the text categories and the audio categories.

8. The method of claim 1, wherein assigning the text categories for the call and assigning the audio categories for the call comprise:

employing a deep learning model having functionality of the automatic speech recognition integrated with acoustic layers and textual layers on the speech signal to assign the text categories and the audio categories.

9. The method of claim 1, further comprising:

determining a language spoken within the speech signal;

wherein generating the textual transcript of the audio signal includes generating the textual transcript based on the automatic speech recognition of the speech signal using the determined language;

wherein assigning the text categories for the call includes assigning the text categories based on the automated multi-label textual classification of the textual transcript and the determined language; and wherein assigning the audio categories for the call includes assigning the audio categories based on the automated multi-label acoustic classification of the speech signal and the determined language.

10. The method of claim 1, wherein generating the output label for the call comprises:

determining an intent of the caller based on the combined analysis of the text categories, the audio categories, and the audio characteristics.

11. A computing device, comprising:

a memory that stores computer instructions; and a processor that executes the computer instructions to:

receive an audio signal associated with a call;

extract a speech signal from the audio signal;

identify audio characteristics based on an analysis of the audio signal;

generate a textual transcript of the audio signal based on automatic speech recognition of the speech signal;

assign text categories for the call based on an automated multi-label textual classification of the textual transcript;

assign audio categories for the call based on an automated multi-label acoustic classification of the speech signal; and generate an output label for the call based on an analysis of the text categories, the audio categories, or the audio characteristics.

12. The computing device of claim 11, wherein the processor further executes the computer instructions to:

determine that the output label identifies the call as unwanted; and in response to determining that the call is unwanted, terminate the call.

13. The computing device of claim 11, wherein the processor further executes the computer instructions to:

determine that the output label identifies the call as wanted; and in response to determining that the call is wanted, forward the call to a destination device.

14. The computing device of claim 11, wherein the processor further executes the computer instructions to:

determine that the output label identifies the call as wanted; and in response to determining that the call is wanted, label a caller of the call as a non-spammer.

15. The computing device of claim 11, wherein the processor generates the output label for the call by further executing the computer instructions to:

analyze the text categories, the audio categories, and the audio characteristics using a machine learning model trained from training text category data, train audio category data, and training audio characteristic data; and employ the machine learning model to generate the output label indicating a probability that the call is unwanted.

16. The computing device of claim 11, wherein the processor assigns the text categories for the call by further executing the computer instructions to:

employ a modified classical transformer-based text architecture on the speech signal to assign the text categories, wherein the modified classical transformer-based text architecture includes functionalities of the automatic speech recognition and the automated multi-label textual classification.

17. The computing device of claim 11, wherein the processor assigns the text categories for the call and assigns the audio categories for the call by further executing the computer instructions to:

employ a machine learning model or a deep learning model having acoustic layers and textual layers on the speech signal and the textual transcript to assign the text categories and the audio categories.

18. The computing device of claim 11, wherein the processor assigns the text categories for the call and assigns the audio categories for the call by further executing the computer instructions to:

employ a deep learning model having functionality of the automatic speech recognition integrated with acoustic layers and textual layers on the speech signal to assign the text categories and the audio categories.

19. The computing device of claim 11, wherein the processor further executes the computer instructions to:

determine a language spoken within the speech signal;

generate the textual transcript for the audio signal based on the automatic speech recognition of the speech signal using the determined language;

assign the text categories for the call based on the automated multi-label textual classification of the textual transcript and the determined language; and assign the audio categories for the call based on the automated multi-label acoustic classification of the speech signal and the determined language.

20. A system, comprising:
- a means for extracting a speech signal from an audio signal associated with a call;
- a means for identifying audio characteristics based on an analysis of the audio signal;
- a means for generating a textual transcript of the audio signal based on automatic speech recognition of the speech signal;
- a means for assigning text categories for the call based on an automated multi-label textual classification of the textual transcript;
- a means for assigning audio categories for the call based on an automated multi-label acoustic classification of the speech signal; and
- a means for generating an output label for the call based on a combined analysis of the text categories, the audio categories, and the audio characteristics.

21. The system of claim 20, wherein the means for assigning the text categories for the call comprises:
- a means for employing a modified classical transformer-based text architecture on the speech signal to assign the text categories, wherein the modified classical transformer-based text architecture includes functionalities of the automatic speech recognition and the automated multi-label textual classification.

22. The system of claim 20, wherein the means for assigning the text categories for the call and the means for assigning the audio categories for the call comprises:
- a means for employing a machine learning model or a deep learning model having acoustic layers and textual layers on the speech signal and the textual transcript to assign the text categories and the audio categories.

23. The system of claim 20, wherein the means for assigning the text categories for the call and the means for assigning the audio categories for the call comprises:
- a means for employing a deep learning model having functionality of the automatic speech recognition integrated with acoustic layers and textual layers on the speech signal to assign the text categories and the audio categories.

24. A method, comprising:
- receiving an audio signal associated with a call;
- extracting a speech signal from the audio signal;
- determining a language spoken within the speech signal;
- identifying audio characteristics based on an analysis of the audio signal;
- generating a textual transcript of the audio signal based on automatic speech recognition of the speech signal using the determined language;
- assigning text categories for the call based on an automated multi-label textual classification of the textual transcript and the determined language;
- assigning audio categories for the call based on an automated multi-label acoustic classification of the speech signal and the determined language; and
- generating an output label for the call based on a combined analysis of the text categories, the audio categories, and the audio characteristics.

* * * * *